(12) United States Patent
Lee et al.

(10) Patent No.: US 12,481,372 B2
(45) Date of Patent: Nov. 25, 2025

(54) JAPANESE CHARACTER INPUT TOOL AND INPUT METHOD

(71) Applicants: Jong Heon Lee, Seoul (KR); In Oak Ko, Seoul (KR); Si Yeung Lee, Seoul (KR)

(72) Inventors: Jong Heon Lee, Seoul (KR); In Oak Ko, Seoul (KR); Si Yeung Lee, Seoul (KR)

( * ) Notice: Subject to any disclaimer, the term of this patent is extended or adjusted under 35 U.S.C. 154(b) by 0 days.

(21) Appl. No.: 18/706,099

(22) PCT Filed: Nov. 1, 2022

(86) PCT No.: PCT/KR2022/016901
§ 371 (c)(1),
(2) Date: Apr. 30, 2024

(87) PCT Pub. No.: WO2023/075565
PCT Pub. Date: May 4, 2023

(65) Prior Publication Data
US 2024/0419260 A1    Dec. 19, 2024

(30) Foreign Application Priority Data

Nov. 1, 2021 (KR) .................. 10-2021-0148094
Jan. 13, 2022 (KR) .................. 10-2022-0005235

(51) Int. Cl.
*G06F 3/023* (2006.01)
*G06F 3/01* (2006.01)

(52) U.S. Cl.
CPC .............. *G06F 3/023* (2013.01); *G06F 3/018* (2013.01)

(58) Field of Classification Search
CPC .................... G06F 3/023; G06F 3/018
See application file for complete search history.

(56) References Cited

U.S. PATENT DOCUMENTS 5,861,821 A * 1/1999 Kato .................. G06F 3/0219
341/23
5,999,950 A * 12/1999 Krueger .................. G06F 3/018
715/263

(Continued)

FOREIGN PATENT DOCUMENTS

KR    10-2005-0096060 A    10/2005
KR    10-2008-0103223 A    11/2008
(Continued)

*Primary Examiner* — Ariel A Balaoing
(74) *Attorney, Agent, or Firm* — KORUS Patent, LLC; Seong Il Jeong

(57) ABSTRACT

The present invention provides an input device and input method that can intuitively judge Japanese language through an input device such as a mobile phone or a computer vending machine and allow quick input using a method different from existing input systems. Disclosed is a Japanese character input device and the Japanese character input device comprises a first portion for inputting consonants and a second portion for inputting vowels, and comprises silent keys indicating Japanese syllables in combination with " あ ", " い ", " う ", " え ", and " お " keys in the second portion.

20 Claims, 5 Drawing Sheets

(56) References Cited

U.S. PATENT DOCUMENTS

| | | | |
|---|---|---|---|
| 6,356,258 B1* | 3/2002 | Kato | G06F 3/0233 |
| | | | 345/169 |
| 6,392,964 B2* | 5/2002 | Koyata | G06F 40/53 |
| | | | 369/30.04 |
| 2002/0054135 A1* | 5/2002 | Noguchi | G06F 3/0236 |
| | | | 715/788 |
| 2008/0046824 A1* | 2/2008 | Li | G06Q 10/109 |
| | | | 707/999.007 |
| 2015/0113467 A1* | 4/2015 | Kim | G06F 3/0236 |
| | | | 715/773 |
| 2015/0185868 A1* | 7/2015 | Bevoor | G06F 3/0234 |
| | | | 345/171 |
| 2015/0199426 A1* | 7/2015 | Lim | G06F 16/338 |
| | | | 707/723 |
| 2017/0255598 A1* | 9/2017 | Sendai | G10L 15/1815 |
| 2019/0004696 A1* | 1/2019 | Sanou | G06F 3/018 |

FOREIGN PATENT DOCUMENTS

| | | |
|---|---|---|
| KR | 10-2014-0050796 A | 4/2014 |
| KR | 10-202-10057900 A | 5/2021 |
| KR | 10-2021-0058291 A | 5/2021 |

* cited by examiner

|  | н | р | м | аa | Яя |
|---|---|---|---|---|---|
| к | с | т | х | Ии | Юю |
| г | ж | д | б | уy | ёё |
| っ | 々 | ん | п | Ээ | оaоa |
| ` | 。 | ー | - | Оo | Оo |

アカサ　ABC　あ#1　∪　↵　⌫

|  | 你 | 热 | 马 | 啊啊 | 呀呀 |
|---|---|---|---|---|---|
| 卡 | 四 | 他 | 好 | 一一 | 鱼鱼 |
| 个 | 己 | 大 | 八 | 五五 | 哟哟 |
| っ | 々 | ん | 帕 | 饿饿 | 瓦瓦 |
| ` | 。 | ー | - | 哦哦 | 噢噢 |

アカサ　ABC　あ#1　∪　↵　⌫

1

Prior Art

JAPANESE CHARACTER INPUT TOOL AND INPUT METHOD

TECHNICAL FIELD

The present invention relates to a Japanese character input device and input method.

BACKGROUND ART

Hangul, created as Hunminjeongeum, is the most scientific language that expresses sounds, consisting of an initial consonant, a neuter consonant and a final consonant. In South Korea, publications have been produced by printing letters with each letter engraved as seen in metal type since ancient times. As typing machines were invented in the West, keyboards were used as input devices. The order of the keys arranged on this keyboard forms the English keyboard of the current computer. As keyboards were introduced into South Korea, keyboards with consonants arranged on the left and vowels on the right became widely distributed in the country according to the frequency of use of Hangul and the convenience of input. Recently, with the spread of smartphones, various types of simple screen input devices have become popular. However, looking at the development process of character input devices, it can be seen that there is a room for more improvement and innovation than any other field.

Meanwhile, from a global perspective, since each country's character input method may differ depending on its own traditional characters, languages, and lifestyle habits, it is not easy to implement a unified character input device. However, by utilizing the scientific nature and universality of Hangul's structure, it is possible to impart unity and convenience in inputting foreign language characters. The present invention applies this to Japanese language.

Specifically, the present invention relates to an input device and an input method that can intuitively judge Japanese language through an input device such as a mobile phone or a computer vending machine and allow quick input using a method different from existing input systems.

The smartphone input device, which is currently widely used as a Japanese character input device, has a structure of 4 rows×5 columns, as shown in FIG. 8. In order to input "あ" (A; pronounced in Hangul) using this input device, press the "あ" key once. By the way, in order to input "お" (o), press the "あ" key five times because there is no "お" key. The Japanese vowel word order is "A, I, U, E, O", wherein only the typical first vowel, "A" is set to a key, and the remaining vowels are displayed by repeatedly pressing this typical key. In order to input "ぽっ" (pot) with this input device, first press the "は" (ha) key five times to display "ほ" (ho), find and press the "。" key, then press the "た" (ta) key three times to convert it to "つ" (tsu), and then press the key to convert it to the lowercase letter "っ". For this purpose, a total of 11 key inputs are required.

Therefore, current Japanese character input devices are discomfort for not only for Japanese but also for foreigners, it takes time to type, and if a typical key has to be pressed multiple times, there is a high risk of typing mistake occurring.

In order to eliminate the discomfort of inputting Japanese characters, a patent that divides Japanese into consonant and vowel parts and inputs them using keys has been disclosed.

As an example, Korean Patent No. 10-1426643 (registered on Jul. 29, 2014) discloses an input device configured to dispose a consonant key group 11' consisting of alphabet consonant keys such as "K", "H", "N", "T", "S", "W", etc. and a vowel key group 12' consisting of the alphabet vowel keys "A", "I", "U", "E", "O", and "Y", wherein central input keys 11a' and 12a' are arranged in the center, and a plurality of peripheral input keys 11b' and 12b' are arranged around the central input keys 11a' and 12a' as shown in FIG. 9. When pressing the central input key 11a', new consonants of "M", "R", "P", "t", and "V" are displayed on the peripheral input key 11b'. 11c' and 12c' are border keys for switching keys. However, in this patent, the display of consonants is complicated, and as will be described later, the processing of the silent value "ㅇ" is not considered at all.

In Korean Unexamined Patent Publication No. 10-2014-0050796 discloses a keypad arrangement that arranges keys to display vowels on the left side of the keyboard, arranges keys to display consonants in the remaining part, and displays a voiced consonant and a double consonant by pressing consonant keys repeatedly, as shown in FIG. 10. However, this patent also does not consider about the processing of the silent word "ㅇ" at all. In addition, because the focus is on the simplicity of the keyboard, there is a drawback that it is inconvenient to input the semi-vowels often used in Japanese, such as "や" (ya), "ゆ" (yu), "よ" (yo), "わ" (wa), and "を" (o).

Furthermore, the above-mentioned patents exemplify a Roman alphabet keyboard as an input device, which lacks the scalability and universality that can be applied to foreigners who are not familiar with Roman characters, and Japanese or Koreans who are familiar with native characters.

Focusing on such points, the present inventors have developed a new input device and input method having a new configuration that solve the problems of the current technology and prior patents and at the same time, allow Japanese characters to be input quickly and accurately.

DETAILED DESCRIPTION OF THE INVENTION

Technical Problem

Therefore, it is an object of the present invention to provide a Japanese character input device and input method that can intuitively judge Japanese language through an input device such as a mobile phone or a computer vending machine, and can be inputted quickly and without typing mistake using a method different from existing input systems.

Technical Solution

In order to achieve the above objects, according to the present invention, there is provided a Japanese character input device comprising a first portion for inputting consonants and a second portion for inputting vowels, and comprising silent keys indicating Japanese syllables in combination with "あ," "い," "う," "え," and "お" keys in the second portion.

In the description of the following configuration, the silent key may be disposed in the first portion or elsewhere.

When pressing the silent key and pressing the "あ" key, "あ" is input, when pressing the silent key and pressing the "い" key, "い" is input, when pressing the silent key and pressing the "う" key, "う" is input, when pressing the silent key and pressing the "え" key, "え" is input, and when pressing the silent key and pressing the "お" key, "お" is input.

The first portion includes the keys "な" "ら" and "ま" the keys "か", "さ", "た" and "は", the keys "が", "ざ", "だ", "ば" and "ぱ", and each key inputs a typical sound of a consonant.

The first portion may further include the keys "つ", "々" and "'ん".

The first portion further includes the keys "や", "ゆ", "よ", "れ" and "を", and each of these keys may display Japanese syllables in combination with silent keys.

Also, according to the present invention, there is provided a Japanese character input device comprising a first portion for inputting consonants and a second part for inputting vowels, wherein the first portion includes a silent key that displays a Japanese syllable in combination with the "あ", "い", "う", "え" and "お" keys of the second portion, and Japanese syllables are input by essentially using a combination of at least one key in the first portion and at least one key in the second portion.

In addition, according to the present invention, there is provided a Japanese character input device comprising a Korean keyboard, wherein the Japanese character input device includes a first portion for inputting consonants and a second part for inputting vowels, and includes silent keys that display Japanese syllables in combination with the "ㅏ", "ㅣ", "ㅜ", "ㅔ", and "ㅗ" keys.

Further, according to the present invention, there is provided a Japanese character input device comprising a Korean keyboard, wherein the Japanese character input device includes a first portion for inputting consonants and a second part for inputting vowels, and includes silent keys that display Japanese syllables in combination with the "ㅏ", "ㅣ", "ㅜ", "ㅔ", and "ㅗ" keys of the second portion.

Further, according to the present invention, there is provided a Japanese character input device comprising an English keyboard, wherein the Japanese character input device includes a first portion for inputting consonants and a second portion for inputting vowels, and includes silent keys that displays Japanese syllables in combination with the "a", "i", "u", "e" and "o" keys of the second portion.

Further, the present invention provides a global Japanese character input solution consisting of other foreign language keyboards, such as Chinese keyboards and Russian keyboards.

Advantageous Effects

A Japanese character input device according to the present invention inputs Japanese syllables based on the combination of consonants and vowels, and thus exhibits the effect of providing a Japanese character input device that maintains consistency in the input systems and allows for intuitive and easy Japanese character input, thus making it convenient and less likely to make a typing mistake.

Since the Japanese character input device according to the present invention is based on a combination of consonants and vowels, and thus exhibits the effect of being able to implement a Japanese character input device that achieves the same function by using other foreign language keyboards such as Korean, English, Russian, Chinese, and Myanmar languages.

The Japanese character input device according to the present invention has scalability and versatility in that it can be widely applied to mobile devices such as smartphones, fixed computers, physical keyboards, touch boards, and even virtual keyboards.

BRIEF DESCRIPTION OF THE DRAWINGS

FIG. 1 is a diagram of a Japanese character input device according to a preferred embodiment of the present invention.

FIG. 2 is a diagram of a Katakana keyboard input device corresponding to the Japanese character input device of FIG. 1.

FIG. 3 is a diagram of a Korean keyboard input device corresponding to the Japanese character input device of FIG. 1.

FIG. 4 is a diagram of an English keyboard input device corresponding to the Japanese character input device of FIG. 1.

FIG. 5 is a diagram of a Russian keyboard input device corresponding to the Japanese character input device of FIG. 1.

FIG. 6 is a diagram of a Chinese keyboard input device corresponding to the Japanese character input device of FIG. 1.

DETAILED DESCRIPTION OF THE EMBODIMENTS

Figures 7, 8:
FIG. 7 is a diagram of a Myanmar language keyboard input device corresponding to the Japanese character input device of FIG. 1.
FIG. 8 is a diagram showing a Japanese character input device of a prior art.
Figure 9:
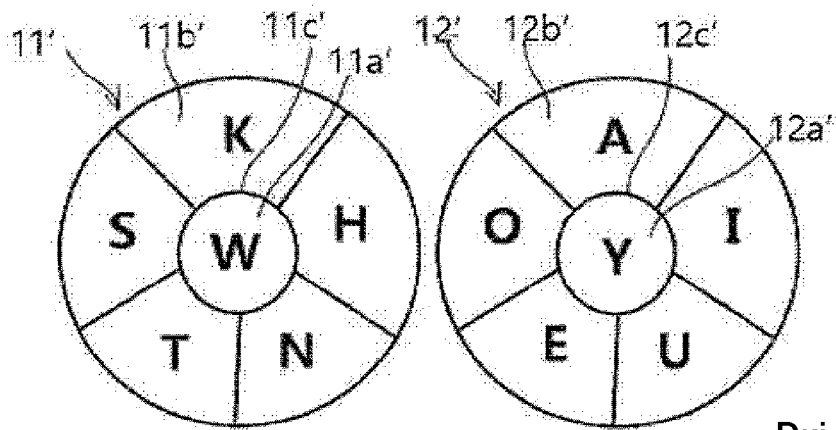
FIG. 9 is a diagram showing the Japanese character input device of the prior patent.
Figure 10:
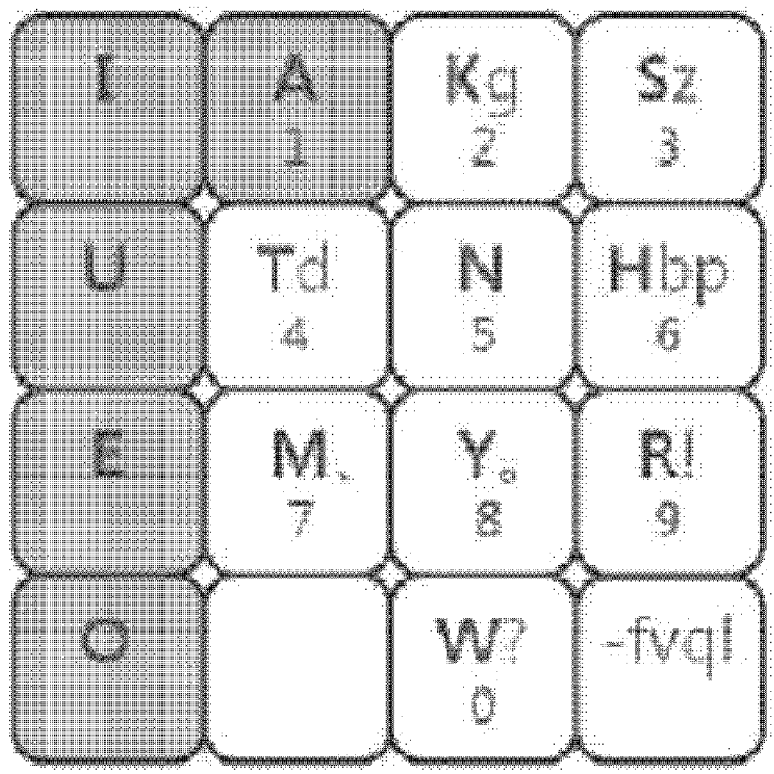
FIG. 10 is a diagram showing a Japanese character input device of another prior patent.

Hereinafter, a preferred embodiment of the present invention will be described in detail with reference to the accompanying drawings.

One of the features of the present invention resides in the input of the five basic vowels located in the "あ" line of Japanese: "あ" (a; pronounced in Korean) "い" (i), "う" (u), "え" (e) and "お" (o). Each of these is five vowels based on the silent consonant "ㅇ" (ieung). However, if it is used together with a consonant, for example, if it is used in "na, ni, nu, ne, no", it is mixed into the consonant while forming each syllable to thereby lose its original silent sound. However, in Japanese language, these five basic vowels often have to be expressed as independent silent syllables, and so it is reasonable and convenient to use a unique input method.

The "Japanese character input device" of the present invention should be interpreted in the broadest possible sense to include not only mobile devices such as smartphones and computer keyboards, but also image keyboards and virtual keyboards displayed on the screens of these devices, and input devices that have separately modularized keyboards.

Figures 1, 2:
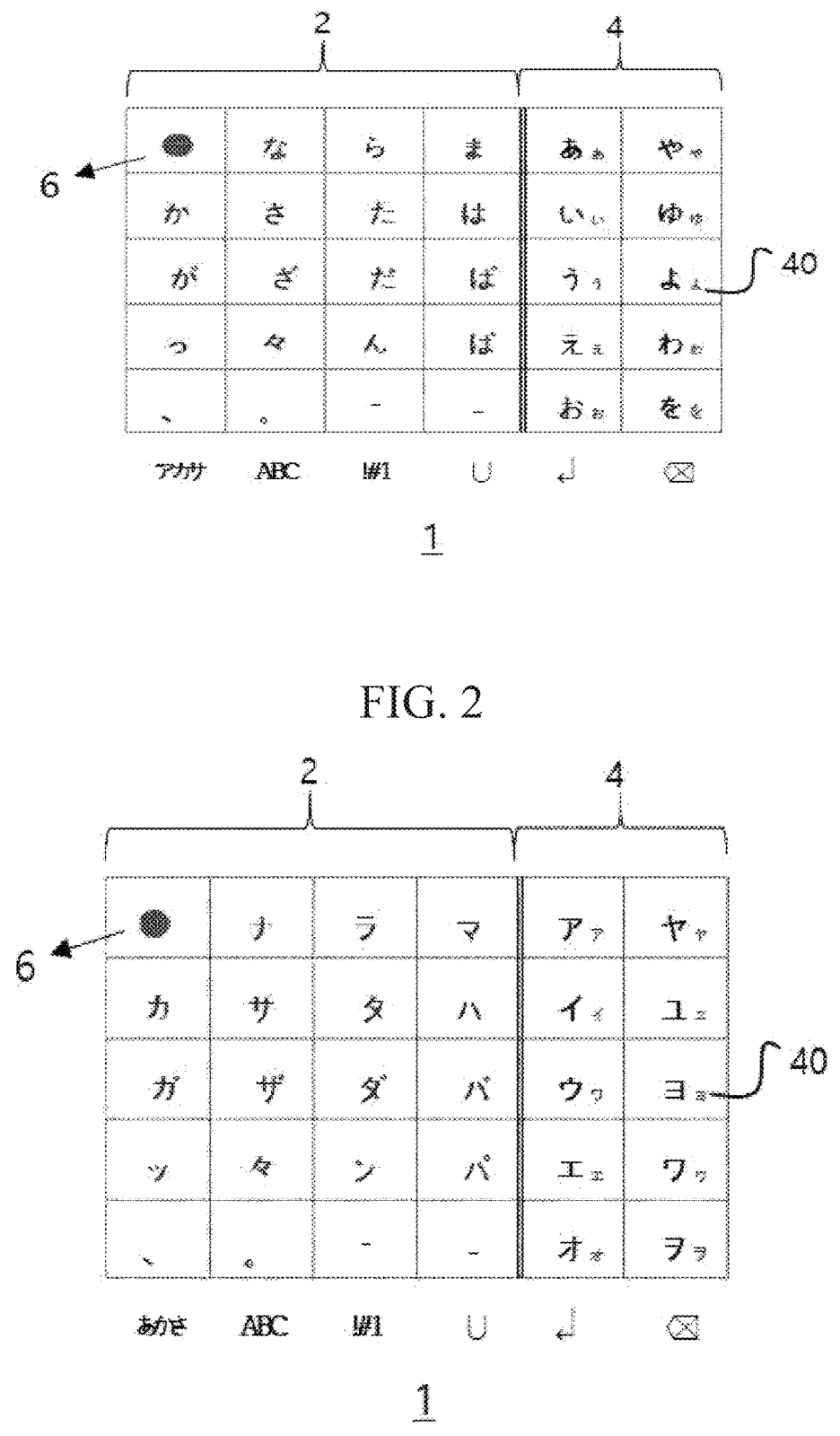

FIG. 1 is a diagram of a Japanese character input device 1 according to a preferred embodiment of the present invention. The Japanese character input device 1 of the present invention is explained based on an example suitable for the display of a smartphone for convenience, but the present invention is not limited thereto.

The Japanese character input device 1 of the present invention has a structure of 5 rows×6 columns, which is not significantly different from the current input device frame, and therefore can be applied to current technology as it is. The Japanese character input device 1 includes a first portion 2 on the left that mainly inputs consonants and a second portion 4 on the right that mainly inputs vowels.

The first portion 2 has a structure of 5 rows×4 columns, wherein in the 1st row and 1st column, a silence key 6 indicating a silence value is displayed as "•". The keys "な", "ら" and "ま" are arranged in columns 2 to 4 of the 1st row. The keys "か", "さ", "た" and "は" are arranged in columns 1 to 4 of the 2nd row. The keys "が", "ざ", "だ" and "ば" are arranged in columns 1 to 4 of the 3rd row. The keys "っ", "々" (repetition sign), "ん" and "ぱ" are arranged in columns 1 to 4 of the 4th row. Code keys representing periods, commas, and dashes are arranged in the 5th row. It should be noted that each consonant key arranged in the first portion 2 is for displaying the typical sound represented by each consonant, and the Japanese consonant displayed on that key is not input immediately with a single keystroke.

These arrangements reflect the order of the 50 Japanese sounds, frequency of use, and user convenience, and are optimally configured through the research conducted by the present inventors, but various changes can be made without deviating from the scope or sprit of the present invention.

The second portion 4 has a structure of 5 rows×2 columns, wherein the basic vowels "あ", "い", "う", "え" and "お" are arranged in the 1st row. In the 2nd row, the keys "や", "ゆ", "よ", "わ" and "を" are arranged, including semi-vowels. In each set of keys in the second portion 4, auxiliary characters 40 written in lowercase letters are displayed in parallel. This is to inform that pressing the corresponding key twice will input a lowercase vowel, as will be described later.

When attempting to input "あ" using the Japanese character input device of the present invention, press the silent key 6 and then press the "あ" key. When attempting to input "い", press the silent key 6 and then press the "い" key. "う", "え" and "お" are also the same as above. The present invention combines the basic vowel located in the "あ" line of Japanese with the silent key 6 as described above. Because inputting the silent key 6 is the same as inputting a silent "consonant" as an initial consonant, the vowel become neuter, and the Japanese character input device can maintain the consistency of completing a syllable with two keystrokes. Therefore, it is phonetically reasonable and is very convenient and intuitive for users. This principle applies equally to the five basic vowels as well as the "や", "ゆ", "よ", "わ" and "を" keys in the 2nd row.

Those skilled in the art will easily understand how to create vowels and consonants using the Japanese character input device of the present invention. For example, when attempting to input "か", press the "か" key, and then press the "あ" key. When attempting to input "な", press the "な" key and then press the "あ" key. When attempting to input "ぽ", press the "ぽ" key and then press the "お" key. In this way, in addition to the silent key 6, the input method of "consonant" followed by "vowel" can be consistently applied to most Japanese languages.

In other words, most of the vowels in Japanese pronunciation correspond to the Korean "a, i, u, e, o". Thus, if the five basic vowels corresponding to them are "あ", "い", "う", "え" and "お" keys, which are the five basic vowels corresponding to them, are arranged in the 1stt row of the second portion 4, Japanese syllables without footsteps can be typed in two strokes, which is very quick and convenient.

In addition, in the present invention, the supporting characters of Hangul, "ん" and other characters "っ" and "々" are arranged as independent keys so that they can be input with a single press. Although not shown in the figure, the character "の", which is a frequently occurring character in Japanese, can also be arranged as an independent key to enable single-type entry.

According to the Japanese character input device of the present invention having such a configuration, most Japanese words can be input within 2 to 3 strokes through the consonant arrangement of the first portion 2, the vowel arrangement of the second portion 4, the silent key 6, and the arrangement of the independent key input characters of the first portion 2.

Next, a method of inputting small vowels using the Japanese character input device of the present invention will be described.

For example, when attempting to input "ぎゅ" instead of "ぎゆ", pressing the "い" key after the "が" key, "ぎ" is input (refer to the vowel and consonant combination mentioned above). Next, in order to input "ゆ", press the "ゆ" key subsequent to the silent key (6) (refer to the vowel input using the silent key mentioned above). Then, the word "ぎゆ" is input by pressing the key a total of 4 times. Pressing the "ゆ" key in succession, it changes to lowercase letters and the word "ぎゅ" is input. Touching the key a total of 5 times is sufficient.

When attempting to input only vowels of lowercase letters, for example, when attempting input the lowercase letter "え", pressing the "え" key twice in succession after the "silent key (6), "ぇ" is input.

Although the Japanese character input device of the present invention was described above based on Hiragana, the same explanation applies to Katakana. In addition, the principle of Hangul, which consists of a combination of consonants and vowels, applies equally to Hangul and Roman characters (English). Thereby, it is possible to implement a Japanese character input device in Korean and a Japanese character input device in English.

FIG. 2 is a diagram of a Katakana keyboard input device corresponding to the Japanese character input device of FIG. 1.

Figures 3, 4:
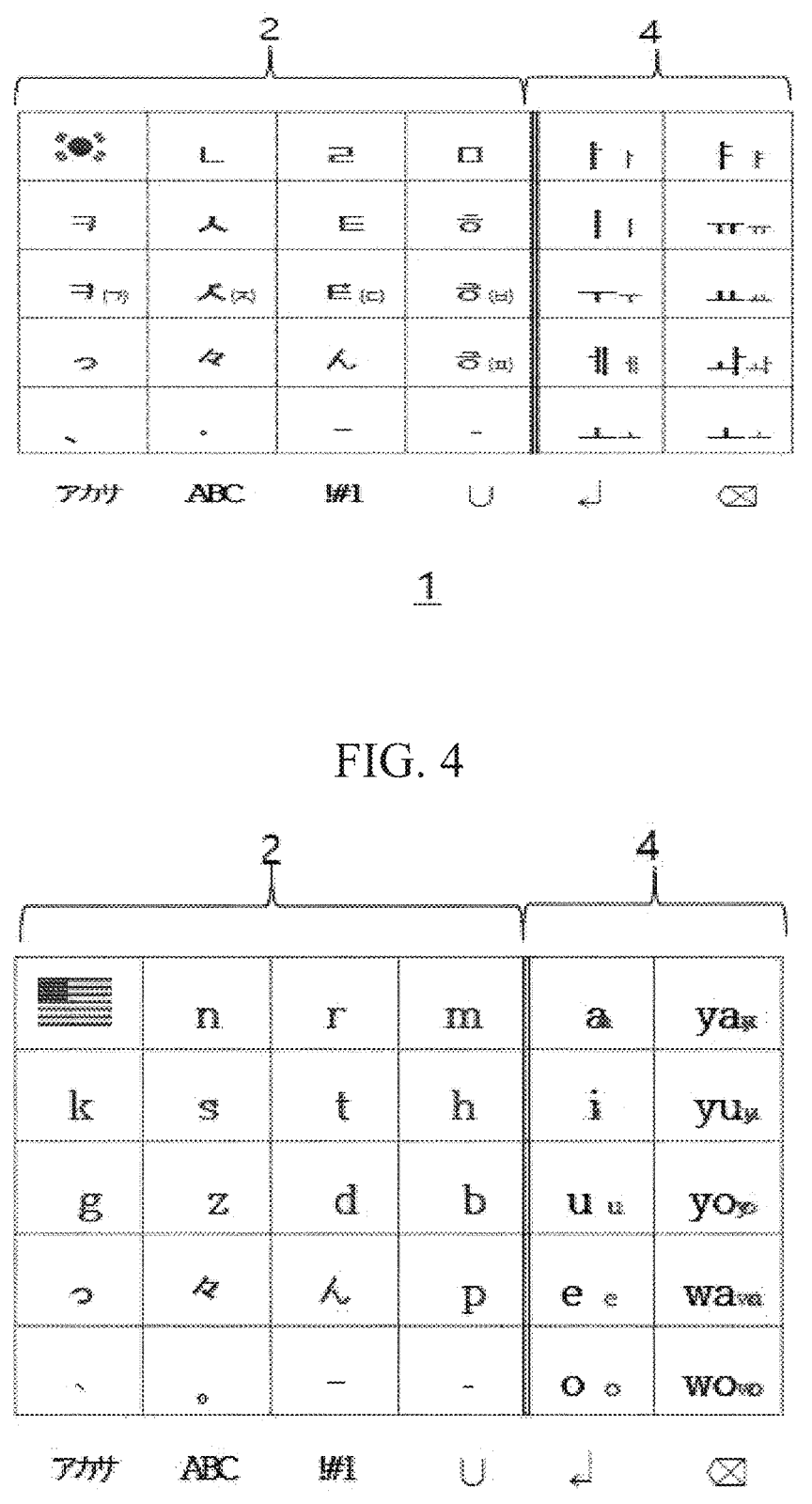

FIG. 3 is a diagram of a Korean keyboard input device corresponding to the Japanese character input device of FIG. 1. Most of the consonants and vowels that make up Hangul are displayed, but the difference is that a sign (ᵥ) to indicate a consonant and a sign (°) to indicate a half-voque are added to the letters in the 3rd and 4th rows. In addition, "っ", "々", and "ん" that cannot be displayed in Korean are displayed in Japanese. The silent key 6 is marked with the Taegeukgi (Korean flag) to indicate that it is Hangul.

FIG. 4 shows the Japanese character input device of the present invention displayed in English. The English consonants shown here, of course, refer to the pronunciation that represents the initial consonant. When using English characters, the symbols for pronunciation and semi-voice are not used, but "っ", "々" and "ん" that cannot be displayed in English are displayed in Japanese. The silent key (6) is marked with the American flag to inform that it is English.

The Japanese character input device of FIGS. 3 and 4 is convenient for Japanese people as well as foreigners who want to input Japanese. It can also be seen that the Japanese character input device based on the same principles as in FIG. 1 can be easily implemented and expanded using other languages such as German, French, or Chinese.

For example, FIG. 5 shows the Japanese character input device of the present invention using a Russian keyboard. FIG. 6 shows the Japanese character input device of the present invention using a Chinese keyboard. FIG. 7 shows the Japanese character input device of the present invention using a Myanmar language keyboard. Such global Japanese character input devices include a first portion for inputting consonants and a second portion for inputting vowels, wherein the first portion has in common with the second portion that it includes silent keys indicating Japanese syllables in combination with keys indicating pronunciations corresponding to the Japanese words "あ", "い", "う", "え" and "お".

In other words, the principles of the Japanese character input device of the present invention can be universally applied to all languages expressed by human voice.

The key press (touch) sequence when inputting a specific Japanese language using each of the Japanese character input devices shown in FIGS. 1, 3, and 4 is as follows. No matter which one is used, it will be understood that the Japanese input method and sequence are the same as described above. However, the Japanese character input device of the prior art in FIG. 8 was also listed to show comparison of the Key typing numbers.

TABLE 1

| Input Japanese | Input device | Order of input key | Key typing number |
|---|---|---|---|
| ありがとうございます (Arigatogozaimasu) | FIG. 8 | あ らら か゛ ただたか ああぁ かきかきか ゛ああ ぇ ぁぁぁ、 | 28 |
|  | FIG. 1 | ＊あらい が あ た あ ＊う が お ず あ ＊ い ま あ さ ぅ、 | 21 |
|  | FIG. 3 | （illegible） | 21 |
|  | FIG. 4 | ▨arigato▨ugoza▨imasu | 21 |

TABLE 2

| Input Japanese | Input device | Order of input key | Key typing number |
|---|---|---|---|
| ぎゅ (Gyu) | FIG. 8 | かか ゜やや小 | 6 |
|  | FIG. 1 | が い ▨ ゆ ゆ | 5 |
|  | FIG. 3 | （illegible） | 5 |
|  | FIG. 4 | gi▨yu yu | 5 |

TABLE 3

| Input Japanese | Input device | Order of input key | Key typing number |
|---|---|---|---|
| ぽっ (Pot) | FIG. 8 | はははは゛ただなか小 | 11 |
|  | FIG. 1 | ぱ お っ | 3 |
|  | FIG. 3 | （illegible） っ | 3 |
|  | FIG. 4 | p o っ | 3 |

TABLE 4

| Input Japanese | Input device | Order of input key | Key typing number |
|---|---|---|---|
| ぽん (Pon) | FIG. 8 | ははははは゛゛わわわ | 10 |
|  | FIG. 1 | ぱ お ん | 3 |
|  | FIG. 3 | （illegible） ん | 3 |
|  | FIG. 4 | p o ん | 3 |

TABLE 5

| Input Japanese | Input device | Order of input key | Key typing number |
|---|---|---|---|
| どうも。 (Domo.) | FIG. 8 | ただただ゛ああぁ まぁまぁま。 | 15 |
|  | FIG. 1 | だ ぁ ＊ う ま ん 。 | 7 |
|  | FIG. 3 | （illegible） 。 | 7 |
|  | FIG. 4 | do▨umo 。 | 7 |

TABLE 6

| Input Japanese | Input device | Order of input key | Key typing number |
|---|---|---|---|
| じゅうきゅう (Juukyuu) | FIG. 8 | さぅ゛ やや小 ああ あぁぁ やや゛あああ | 17 |
|  | FIG. 1 | さい ＊＊＊ う あい ＊＊＊ う | 14 |
|  | FIG. 3 | （illegible） | 14 |
|  | FIG. 4 | ▨ゆ ゆ▨ゆ ゆ▨ | 14 |

TABLE 7

| Input Japanese | Input device | Order of input key | Key typing number |
|---|---|---|---|
| どうぞよろしくおねがいします (Doujoyorosikuonegaisimas) | FIG. 8 | ただただ゛ああぁ ささささ゛゜ ややや゛ぅぅぅぅ ささ かきか あああきさぅぅか゛ ああ ささ きささぇ、 | 48 |
|  | FIG. 1 | だぉ ＊う ざぉ ＊よらぉ ＊い ぅ ＊ 9 なえ あ ＊い あぃ あ ぅ、 | 29 |
|  | FIG. 3 | （illegible） | 29 |
|  | FIG. 4 | do▨uso▨yo rosiku▨onega▨isimasu. | 29 |

TABLE 8

| Input Japanese | Input device | Order of input key | Key typing number |
|---|---|---|---|
| でんわばんごうはなんばんですか (Dengwabangohananbandesuka) | FIG. 8 | たたたた゛ わわわわ は゛わわわ かかかかか゛ ああぁ は な わわわ は゛わわわ たたたた゛ さささ か。 | 43 |
|  | FIG. 1 | だえんゎわばあんがおうはあ なあえばあんだえるうかあ、 | 27 |
|  | FIG. 3 | (symbols) | 27 |
|  | FIG. 4 | でんゎばんごうはなんばんですか、de ん ba ん go uhana ん ba ん desuka. | 27 |

Although the preferred embodiments of the present invention have been described above, the present invention can be modified in various ways within the technical concept of introducing silent keys and displaying Japanese syllables with essential combination of consonants and vowels. For example, the silent key 6 can be placed in the second portion 4 or installed independently as a separate key in the space between the first portion 2 and the second portion 4 or outside for better identification.

One of the advantages of the Japanese character input device of the present invention is that it can dramatically reduce the number of typing or touches.

The arrangement of the keys and keyboard of the Japanese character input device is optimal and is shown as an example, and various changes are possible. For example, the first portion 2 is arranged on one side of the input device and the second portion 4 is arranged separately from each other, or the first device for the first portion and the second device for the second portion can be manufactured separately. It is obvious that these modifications only differ in physical location and fall within the scope of the present invention in terms of input principle and structure.

The scope of rights of the present invention extends to the same or equivalent scope as the scope of the claims described below.

The invention claimed is:

1. A Japanese character input device comprising a first portion with keys for inputting consonants and a second portion with keys for inputting vowels, and comprising a silent key indicating Japanese syllables in combination with "あ", "い", "う", "え" and "お" keys in the second portion, wherein Japanese syllables are input by both a consonant key in the first portion and a vowel key in the second portion, or by both the silent key and a vowel key in the second portion, no Japanese syllable being input by only a vowel key in the second portion.

2. The Japanese character input device according to claim 1, wherein:
when pressing the silent key and pressing the "あ" key, "あ" is input, when pressing the silent key and pressing the "い" key, "い" is input, when pressing the silent key and pressing the "う" key, "う" is input, when pressing the silent key and pressing the "え" key, "え" is input, and when pressing the silent key and pressing the "お" key, "お" is input.

3. The Japanese character input device according to claim 1, wherein:
the first portion includes "な", "ら", and "ま" keys, "か", "さ", "た", and "は" keys, and "が", "ざ", "だ", "ば" and "ぱ" keys; and each key inputs a typical sound of a consonant.

4. The Japanese character input device according to claim 3, wherein:
the first portion further includes "つ", "々", and "ん" keys.

5. The Japanese character input device according to claim 3, wherein:
the first portion further includes a "つ" key.

6. The Japanese character input device according to claim 1, wherein:
the second portion further includes "や", "ゆ", "よ", "わ" and "を" keys, and each of these keys displays Japanese syllables in combination with the silent key.

7. A Japanese character input device comprising a first portion with keys for inputting consonants and a second portion with keys for inputting vowels, wherein the first portion includes a silent key that displays a Japanese syllable in combination with the "あ", "い", "う", "え" and "お" keys of the second portion, and Japanese syllables are input by essentially using a combination of at least one key in the first portion and at least one key in the second portion, no Japanese syllable being input by only a vowel key in the second portion.

8. A Japanese character input device comprising characters of languages other than Japanese, wherein: the Japanese character input device includes a first portion with keys for inputting consonants and a second portion with keys for inputting vowels, the second portion includes a silent key that displays Japanese syllables in combination with a key that displays pronunciations corresponding to Japanese words "あ", "い", "う", "え", and "お" in the second portion, and Japanese syllables are input by essentially using a combination of at least one key in the first portion and at least one key in the second portion, no Japanese syllable being input by only a vowel key in the second portion.

9. The Japanese character input device according to claim 1, wherein the Japanese character input device is a keyboard of a mobile device or a computer, an image keyboard or a virtual keyboard displayed on a screen of these devices, or an input device that modularizes the keyboard.

10. The Japanese character input device according to claim 1, wherein the silent keys is arranged in the first portion.

11. The Japanese character input device according to claim 1, wherein the silent keys is arranged in a place other than the first portion.

12. The Japanese character input device according to claim 1, wherein the first portion and the second portion are arranged so as to be spaced apart from each other.

13. The Japanese character input device according to claim 7, wherein the Japanese character input device is a keyboard of a mobile device or a computer, an image keyboard or a virtual keyboard displayed on a screen of these devices, or an input device that modularizes the keyboard.

14. The Japanese character input device according to claim 8, wherein the Japanese character input device is a keyboard of a mobile device or a computer, an image keyboard or a virtual keyboard displayed on a screen of these devices, or an input device that modularizes the keyboard.

15. The Japanese character input device according to claim 7, wherein the silent keys is arranged in the first portion.

16. The Japanese character input device according to claim 8, wherein the silent keys is arranged in the first portion.

17. The Japanese character input device according to claim 7, wherein the silent keys is arranged in a place other than the first portion.

18. The Japanese character input device according to claim 8, wherein the silent keys is arranged in a place other than the first portion.

19. The Japanese character input device according to claim 7, wherein the first portion and the second portion are arranged so as to be spaced apart from each other.

20. The Japanese character input device according to claim 8, wherein the first portion and the second portion are arranged so as to be spaced apart from each other.

* * * * *